Oct. 4, 1966     W. J. HYLAND ETAL     3,277,349

ELECTROLYTIC CAPACITOR SEAL

Filed Feb. 27, 1963

INVENTORS.
WILLIAM J. HYLAND
ROY A. CANTY
JOHN E. DOODY
BY
Thomas J. Kilgannon Jr.
AGENT

United States Patent Office 3,277,349
Patented Oct. 4, 1966

3,277,349
ELECTROLYTIC CAPACITOR SEAL
William J. Hyland, Palo Alto, and Roy A. Canty, San Jose, Calif., and John E. Doody, Dallas, Tex., assignors to International Telephone and Telegraph Corporation, Nutley, N.J., a corporation of Maryland
Filed Feb. 27, 1963, Ser. No. 261,432
11 Claims. (Cl. 317—230)

This invention relates to electrical devices and more particularly to seals for electrical devices to prevent loss of vapor or fluid therefrom, such as electrolytes in the case of electrolytic capacitors.

One of the major problems in the construction of wet anode type electrolytic capacitors is the prevention of the leakage of an electrolyte in the region of the anode lead. This leakage occurs as a result of excessive absorption of electrolyte by the insulating member of a seal which is ordinarily introduced at the open end of a cylindrical container which forms the cathode of the electrolytic capacitor. Absorption of an electrolyte occurs because the insulating member is relatively permeable to the electrolytes commonly used. The problem is further aggravated because of the environment in which such capacitors are generally utilized. The cycling through temperature extremes or the exposure of such capacitors to temperature extreme for extended periods causes electrolyte leakage at room temperature because of the alternate build-up and release of pressure on the seal. Accordingly, there is a need for a capacitor having an insulating member which is capable of being sealed in a manner which will prevent the leakage of electrolyte from capacitors which are utilized in variable temperature environments in the region of the anode lead.

It is therefore an object of this invention to provide an improved seal which prevents leakage of fluid or vapors from electrolytic capacitors and similar devices.

A further object of this invention is to provide a seal which prevents leakage of fluid in the region of the anode lead from electrolytic capacitors which are cycled over rather wide temperature ranges.

A further object of the invention is to provide a seal which prevents leakage of electrolyte from wet anode type electrolytic capacitors while exposing a minimum area of the insulating member of the seal to the electrolyte of such capacitors.

A feature of this invention is the utilization of a cup-shaped member in conjunction with an insulating plug in an electrolytic capacitor to prevent leakage of electrolyte along a terminal attached to the cup-shaped member.

A further feature of the invention is the utilization of an adhesive coating on an insulating plug which is spread on the surfaces of the plug which are in contact with a cup-shaped or reentrant member, portions of the inner surface of the cylindrical cathode of a capacitor, and a terminal attached to the reentrant member.

A still further feature of this invention is the utilization of the anode of a tantalum capacitor in conjunction with an insulating member to space and support a cup-shaped member from the closed end of a cylindrical cathode member.

The above-mentioned and other features and objects of this invention will become more apparent by reference to the following description taken in conjunction with the accompanying drawings, in which.

Figure 1:
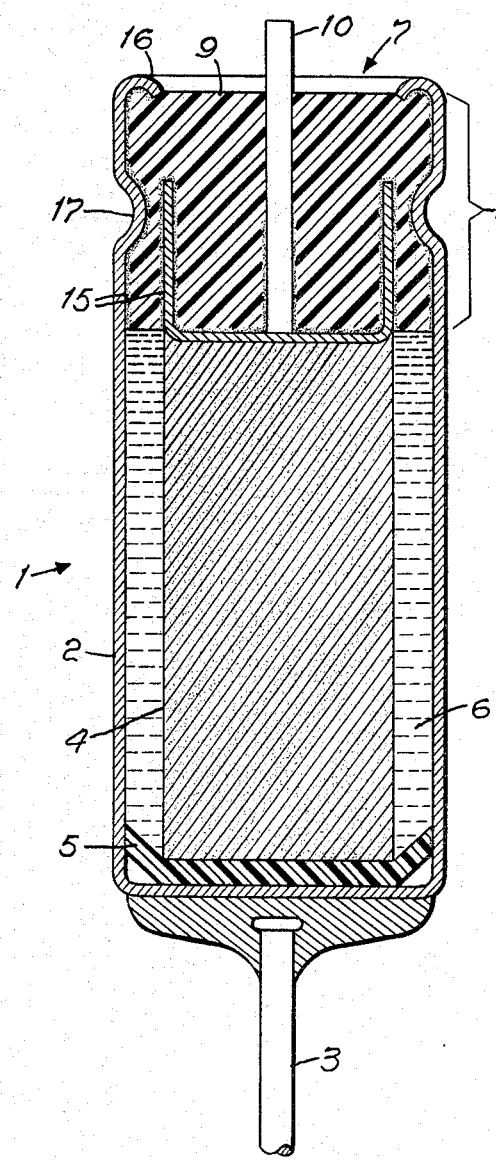
FIG. 1 is a cross-sectional view of a tantalum capacitor utilizing a seal in accordance with the teaching of this invention.
Figure 2:
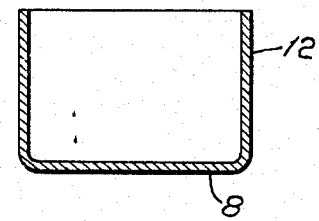
FIG. 2 is a cross-sectional view of the cup-shaped or reentrant member and an anode lead which form part of the seal.
Figure 3:
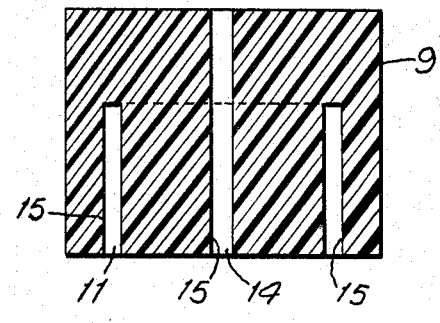
FIG. 3 is a cross-sectional view of an insulating plug which mates with the cup-shaped member of FIG. 2.

Referring now to FIGS. 1, 2, and 3 there is shown in FIG. 1 a wet anode electrolytic capacitor 1 having a cylindrical body 2 which is open at one end and closed at the other thereby forming a metallic cavity. In the usual tantalum electrolytic capacitor, the cylindrical body is the cathode electrode of the capacitor and is made of silver or of copper with silver plated on the internal surface of the cylindrical body 2. A lead 3 soldered to the external surface of body 2 forms the cathode connection of capacitor 1. An anode electrode 4 of porous tantalum is disposed internally of cylindrical body 2 and is spaced from the internal surface thereof by an insulating member 5 made preferably of "Teflon." An electrolyte 6, usually a solution of sulphuric acid, fills the space between the anode 4 and the inner surface of the cylindrical body 2.

A seal shown generally at 7 in FIG. 1 consisting of the cup-shaped or reentrant member 8 of FIG. 2 and the insulating plug 9 of FIG. 3 is shown closing the open end of body 2, thereby preventing the leakage of electrolyte 6 from capacitor 1. Cup-shaped member 8 is preferably made of drawn tantalum and is either welded of sintered to the top of anode 4 prior to assembly of capacitor 1. An anode lead 10 extending from member 8 may be welded or otherwise connected to member 8 at the bottom thereof to provide a second electrical connection for capactior 1. It can be seen in the arrangement of FIG. 1, that anode 4 in addition to its electrical function and in conjunction with insulating member 5 spaces and supports cup-shaped member 8 a given distance from the closed end of body 2 thereby simplifying assembly and other manufacturing operation such as crimping and furling.

In FIG. 3 cylindrical insulating plug 9 made of "Teflon," Kel-F or other suitable insulating material compatible with the electrolyte utilized has an annular recess 11 disposed therein adapted for mating with the upstanding cylindrical wall 12 of cup-shaped member 8. Insulating plug 9 extends to the bottom of member 8 and its outer surface is contiguous with a portion 13 of the inner surface of cylindrical body 2. In addition, plug 9 contains a cylindrical opening 14 for receiving anode lead 10. The surfaces 15 of insulating plug 9, in contact with cup-shaped member 8, anode lead 10, and the inner surface 13 of body 2 may be coated prior to assembly with an unsaturated hydrocarbon adhesive, preferably a polyisobutylene or other adhesive compatible with the electrolyte used, to seal and maintain plug 9 in fixed relationship with cup-shaped member 8. To further seal and maintain the position of insulating plug 9, the rim 16 of cylindrical body 2 is spun, furled, or crimped over the edge of plug 9. Finally, an indentation or beading 17 is provided adjacent cup-shaped member 8 to complete the seal. Indentation 17 compresses a portion of plug 9 reducing the area between the plug 9 and the upstanding wall 12 of member 8, thereby further reducing the possibility of electrolyte leakage through that portion of the plug which is exposed to the electrolyte.

Thus far, the seal 7 has been discussed in connection with its use in electrolytic capacitors, but its use is not limited to such devices. Other devices such as batteries and fuel cells containing fluids or vapors in which leakage is a problem may utilize the seal of this invention. The cylindrical shape of the container is usually preferable where mounting and space factor requirements are stringent, but neither the container nor the cup-shaped or reentrant member need by cylindrical. The body 2 of FIG. 1 may be rectangular, square, or oval and the cup-shaped member may be similarly shaped. When the body and the cup-shaped members are of similar shape, (other factors such as ease of manufacture and assembly being considered) a minimum area of the insulating plug is exposed to the fluid held by the body and leakage through this relatively permeable material is thereby minimized.

The seal of this invention has been found to be extremely effective in preventing electrolyte leakage which occurs in capacitors as a result of cycling between extremes of temperature. By isolating the anode lead of the electrolytic capacitor from any contact whatsoever with the electrolyte, leakage at the anode lead has been substantially eliminated. Further, by permitting only a minimum area of the insulating plug 9 to contact the electrolyte, leakage because of the permeability of the insulating material has been substantially overcome. This minimum area of contact in conjunction with beading 17 adjacent the upstanding walls 12 of cup-shaped element 8 compressing the material of plug 9 presents a high resistance leakage path for the electrolyte. Also, the lengths of the leakage paths and the use of the adhesive to seal the insulating plug makes it extremely unlikely that leakage will occur at the anode lead.

While we have described above the principles of our invention in connection with specific apparatus, it is to be clearly understood that this description is made only by way of example and not as a limitation to the scope of our invention as set forth in the objects thereof and in the accompanying claims.

We claim:

1. A seal for a fluid containing device having an open end and a closed end and a terminal to extend through the seal from said open end comprising a cup-shaped member adapted for insertion bottom end first into the open end of said device, said cup-shaped member having a terminal secured to the bottom thereof and extending out the open side thereof, means for spacing said member from the closed end of said device, a plug receivable in the open end of said device, said plug having an endless slot and a hole therein adapted to mate with the rim of said cup-shaped member and said terminal, and means to seal and maintain said plug in a given position in the open end of said device.

2. A device according to claim 1 wherein said means to seal and maintain said plug in a given position includes an adhesive substance coated on the surfaces of said plug which contact said device and cup-shaped member.

3. A device according to claim 2 wherein said adhesive includes an unsaturated hydrocarbon.

4. A device according to claim 2 wherein said adhesive includes polyisobutylene.

5. A device according to claim 1 wherein said means to seal and maintain said plug includes the rim of said device furled over said plug to prevent axial movement of said plug.

6. A device according to claim 1 further including an indentation in the wall of said device to compress a portion of said plug adjacent said cup-shaped member to minimize the area of the leakage path betwen said device and said cup-shaped member.

7. A device according to claim 1 wherein said means for spacing said member includes an insulating element disposed adjacent the closed end of said device and a metallic member disposed between the closed end of said cup-shaped member and said insulating member.

8. A wet electrolytic capacitor comprising a conductive body an open cavity therein, a reentrant member receivable in said cavity, insulator means dipsosed internally of said cavity; an electrode immersed in electrolyte contiguous with said insulator and at least a portion of said reentrant member, a first lead coupled to said reentrant member, a plug adapted to be inserted within said cavity and conformal with portions of said lead, said reentrant member, and said cavity, a sealing medium coated on said last mentioned portions; and a second lead coupled to the external surface of said conductive body.

9. A device according to claim 7 wherein said conductive body is the cathode of said electrolytic capacitor.

10. A device according to claim 7 wherein said electrode is the anode of said electrolytic capacitor.

11. A wet electrolytic capacitor comprising a cathode in the form of a cylindrical housing of conductive material, open at the upper end and closed at its bottom end, an electrolyte contained in said housing, an insulating element disposed in the bottom portion of said housing, an anode assembly receivable in said housing in supported relation on said insulating element, said anode assembly comprising a cupped-shaped element, an anode body supported on the bottom side of said cupped-shaped element for at least partial immersion in said electrolyte, an anode lead extending upwardly from said cupped-shaped element, an insulating plug for said housing, said plug having a hole to receive said anode therethrough and a recess to receive the rim of said cupped-shaped element, a sealing medium on the interface surfaces between said plug, said cup and said housing to resist seepage of said electrolyte along said surfaces, and an upper wall portion on said housing being turned inwardly to grip said plug circumferentially thereof.

No references cited.

JOHN W. HUCKERT, *Primary Examiner.*

J. D. KALLAM, *Assistant Examiner.*